United States Patent
Kim

(10) Patent No.: US 10,014,511 B2
(45) Date of Patent: Jul. 3, 2018

(54) BATTERY MODULE AND ELECTRODE TAB ULTRASONIC WAVE WELDING METHOD

(75) Inventor: Wook Hyun Kim, Daegu (KR)

(73) Assignee: SK Innovation Co., Ltd., Seoul (KR)

( * ) Notice: Subject to any disclaimer, the term of this patent is extended or adjusted under 35 U.S.C. 154(b) by 848 days.

(21) Appl. No.: 13/977,871

(22) PCT Filed: Dec. 29, 2011

(86) PCT No.: PCT/KR2011/010271
§ 371 (c)(1),
(2), (4) Date: Jul. 1, 2013

(87) PCT Pub. No.: WO2012/091473
PCT Pub. Date: Jul. 5, 2012

(65) Prior Publication Data
US 2013/0280587 A1    Oct. 24, 2013

(30) Foreign Application Priority Data
Dec. 29, 2010   (KR) ........................ 10-2010-0137981

(51) Int. Cl.
*H01M 2/26*    (2006.01)
*B23K 20/10*   (2006.01)
*H01M 2/20*    (2006.01)

(52) U.S. Cl.
CPC ............... *H01M 2/26* (2013.01); *B23K 20/10* (2013.01); *H01M 2/206* (2013.01); *H01M 2/266* (2013.01); *H01M 2220/20* (2013.01)

(58) Field of Classification Search
CPC ................... H01M 2/26; H01M 2/266; H01M 2/202–2/22
See application file for complete search history.

(56) References Cited

U.S. PATENT DOCUMENTS

| | | | |
|---|---|---|---|
| 2004/0028999 A1 | | 2/2004 | Richard et al. |
| 2004/0121231 A1 | | 6/2004 | Kim |
| 2010/0104939 A1 | | 4/2010 | Wang et al. |
| 2010/0266889 A1 | * | 10/2010 | Kim ................... H01M 2/0257 429/158 |

FOREIGN PATENT DOCUMENTS

| | | |
|---|---|---|
| CN | 101315990 A | 12/2008 |
| JP | 2004253262 A | 9/2004 |
| JP | 2005190885 A | 7/2005 |
| JP | 2005251617 A | 9/2005 |
| JP | 2006324349 A | 11/2006 |
| JP | 2007229788 A * | 9/2007 |
| JP | 2010282767 A | 12/2010 |
| JP | 2010521046 A | 12/2010 |
| WO | 03094258 A2 | 11/2003 |

* cited by examiner

*Primary Examiner* — Stephen Essex
(74) *Attorney, Agent, or Firm* — The Webb Law Firm

(57) ABSTRACT

Provided are a battery module and an electrode tab ultrasonic wave welding method. The present invention relates to a battery module and an electrode tab ultrasonic wave welding method by forming the electrode tab in a zigzag form in which the electrode tab extending upwardly is bent downwardly and then, again bent upwardly to allow the electrode tab formed in the zigzag form to absorb vibrations even when a welding portion formed in parallel with a battery cell is fused by ultrasonic wave vibrations, thereby minimizing damage to the battery cell.

6 Claims, 5 Drawing Sheets

[Fig. 1]
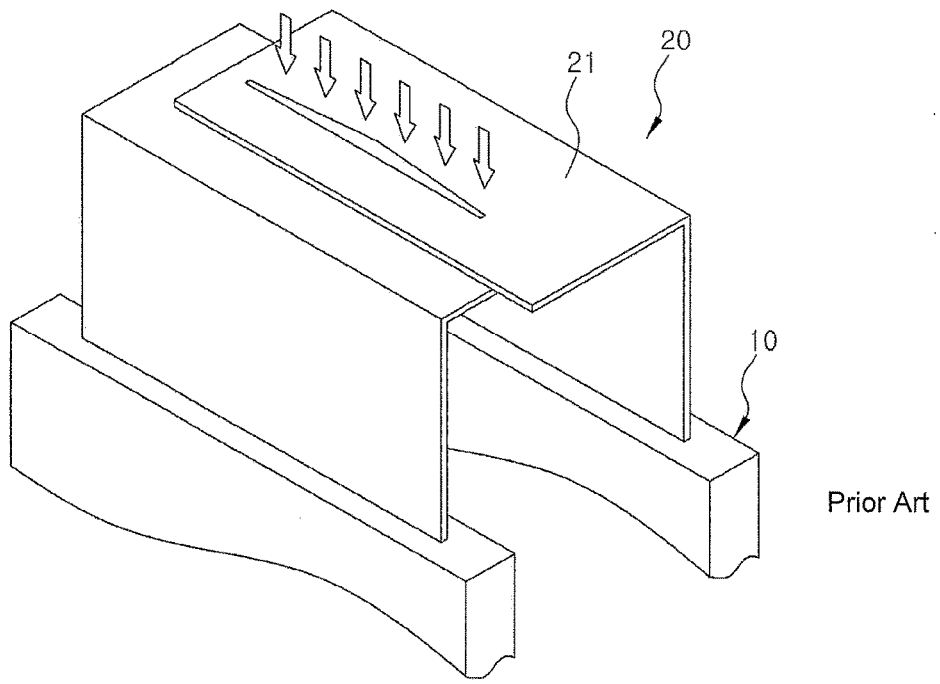
Prior Art
[Fig. 2]
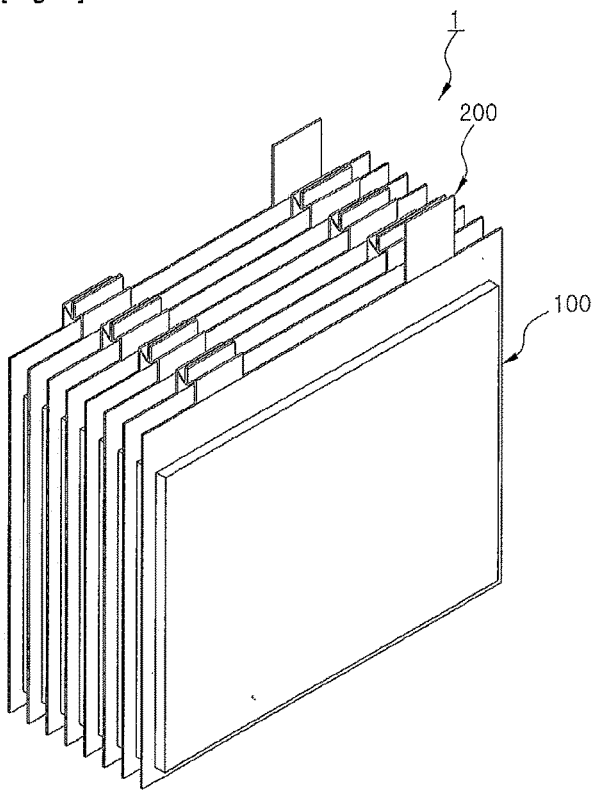

[Fig. 3]
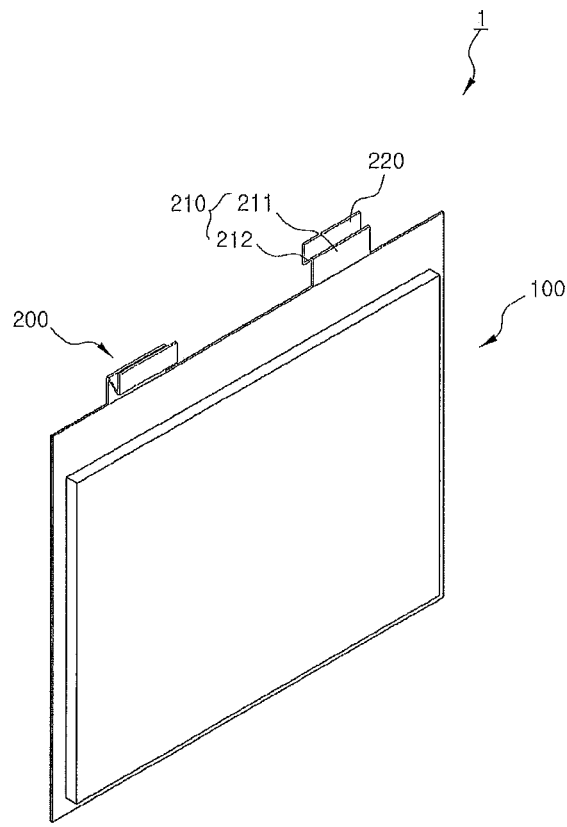
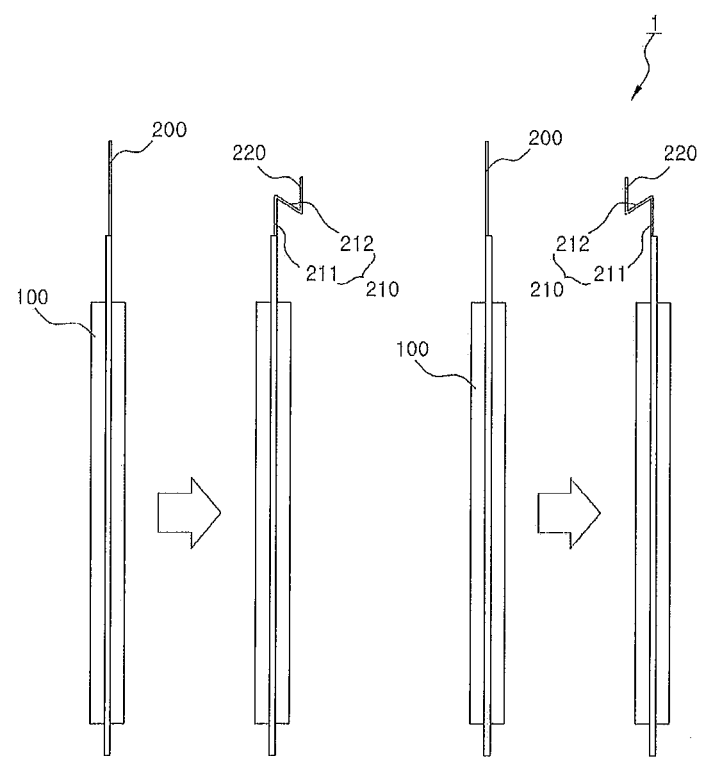
Fig. 4 (a)  Fig. 4 (b)

[Fig. 5]
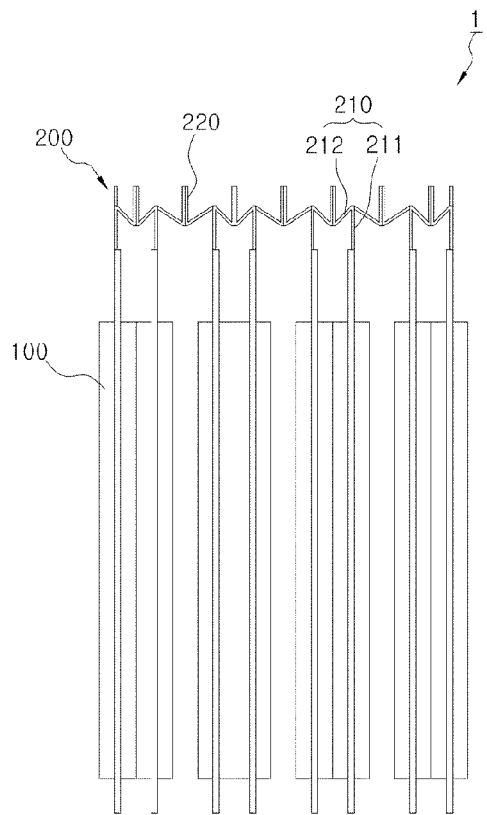
[Fig. 6]
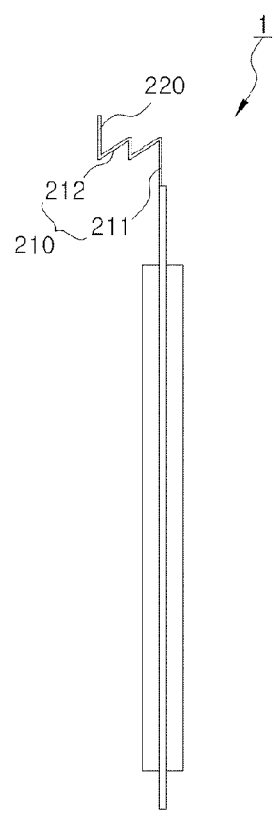

[Fig. 7]
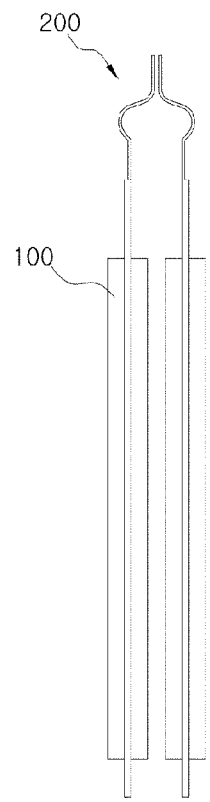
[Fig. 8]
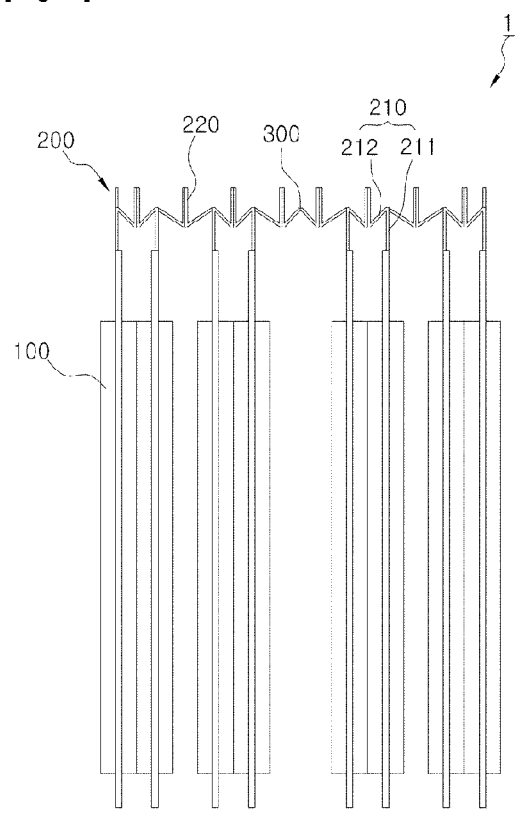

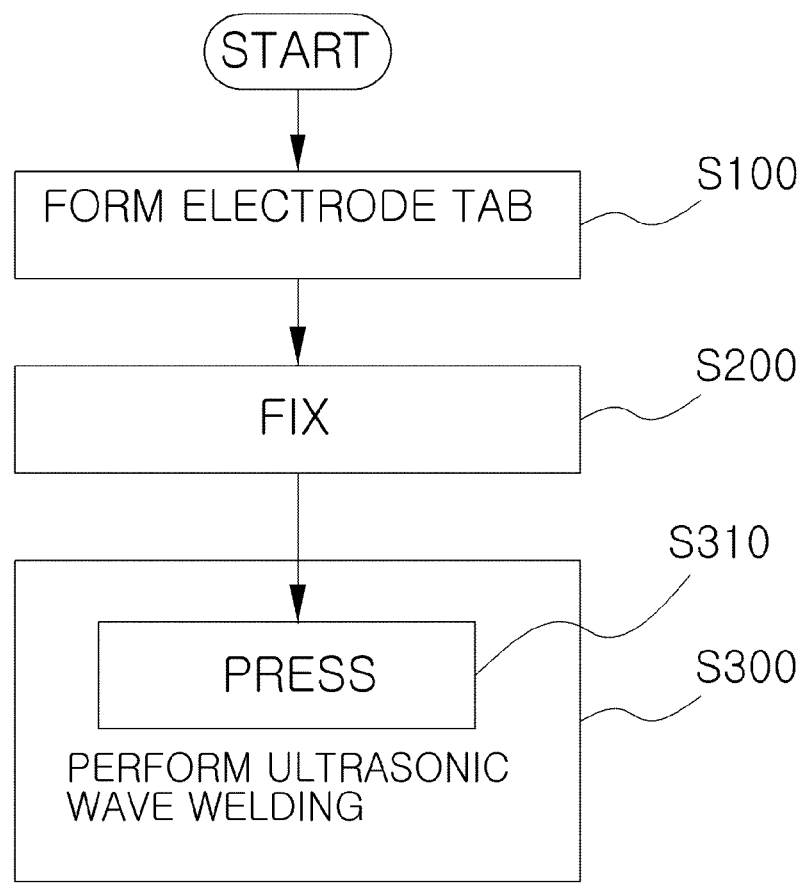
[Fig. 9]

BATTERY MODULE AND ELECTRODE TAB ULTRASONIC WAVE WELDING METHOD

CROSS-REFERENCE TO RELATED APPLICATIONS

This application is a United States national phase under 35 U.S.C. § 371 of International Application No. PCT/KR2011/010271 filed Dec. 29, 2011, entitled "Battery Module and Electrode Tab Ultrasonic Wave Welding Method" and claims priority under 35 U.S.C. § 119(a)-(d) to Korean Patent Application No. 10-2010-0137981, filed on Dec. 29, 2010 in the Korean Intellectual Property Office, which are hereby incorporated by reference in their entireties.

TECHNICAL FIELD

The present invention relates to a battery module and an electrode tab ultrasonic wave welding method. More particularly, the present invention relates to a battery module and an electrode tab ultrasonic wave welding method by forming the electrode tab in a zigzag form in which the electrode tab extending upwardly is bent downwardly and then, again bent upwardly to allow the electrode tab formed in the zigzag form to absorb vibrations even when a welding portion formed in parallel with a battery cell is fused by ultrasonic wave vibrations, thereby minimizing damage to the battery cell.

BACKGROUND ART

A car using an internal combustion engine using gasoline or heavy oil as main fuel has a serious effect on environmental pollution, such as air pollution, or the like. Therefore, many attempts to develop an electric car or a hybrid car have been recently conducted so as to reduce the generation of pollution.

In recent years, a high-output secondary battery using a high energy density non-aqueous electrolyte has been developed.

A large-capacity secondary battery is configured by connecting a plurality of high output secondary batteries in series so that the large-capacity secondary battery may be used for devices requiring large power for driving a motor, such as an electric car, or the like.

As such, in a single large-capacity secondary battery (hereinafter, referred to as a 'battery'), a plurality of cells are connected to one another in series or in parallel.

In this case, the battery is provided with the electrode tab for electrically connecting the plurality of cells to one another, wherein the plurality of cells are connected to one another by using various methods, such as clip, crimping, welding, bolt fastening, or the like.

Among those, FIG. 1 is a diagram showing a welding method according to the related art. The welding method according to the related art shown in FIG. 1 performs welding in a direction vertical to surfaces of welding portions 21 of the electrode tab 20 after the welding portions 21 of the electrode tab are positioned so as to overlap with each other by being bent in a direction vertical to the cells 10.

However, the welding method shown in FIG. 1 cannot easily weld at least three sheets of tabs, connect the tabs in a parallel structure, and weld the tabs to which a cell sensing line, or the like, is added.

In addition, in the case of a laser welding method, a laser spot size is only about 230 μm. Therefore, a portion to be welded should be within the laser spot size, which results in greatly degrading mass production during a module assembling process.

Accordingly a need exists for the development of a battery module and an electrode tab welding method capable of simplifying a welding method and a manufacturing process so as to increase mass production.

DISCLOSURE

Technical Problem

An object of the present invention is to provide a battery module and an electrode tab ultrasonic wave welding method by forming the electrode tab in a zigzag form in which the electrode tab extending upwardly is bent downwardly and then, again bent upwardly to allow the electrode tab formed in the zigzag form to absorb vibrations even when a welding portion formed in parallel with a battery cell is fused by ultrasonic wave vibrations, thereby minimizing damage to the battery cell.

Another object of the present invention is to provide a battery module and an electrode tab ultrasonic wave welding method capable of simplifying a manufacturing process without damaging a battery cell while welding an electrode tab by ultrasonic wave welding having higher mass production than laser welding.

Technical Solution

In one general aspect, there is provided a battery module including at least two battery cells and an electrode tab extending from each of the battery cells and welded to each other by ultrasonic wave welding, the battery module including: an extension in which the electrode tab extending upwardly is bent downwardly and a welding portion in which the extension is again bent upwardly to form a welding surface in a direction parallel with the battery cell.

The battery module may have a serial form in which a negative electrode tab and a positive electrode tab that are adjacent to each other are welded to each other and the negative electrode tab and the positive electrode tab may be bent in a direction facing each other so as to be welded through the welding surface.

The battery module may have a parallel form in which the adjacent electrode tabs having the same polarity are welded to each other and the electrode tabs may be bent in a direction facing each other to be welded to each other through the welding surface.

The extension may include a first extension extending upwardly in parallel with the battery cell and a second extension extending so as to be bent downwardly from an end of the first extension.

The battery module may be formed by repeatedly bending upwardly and downwardly the extension bent downwardly.

The battery module may further include a dummy tap bent in a 'W' or 'N'-letter shape, wherein one side and the other side of the dummy tap are each welded to the electrode tab welding portion of the adjacent battery module.

In another general aspect, there is provided an electrode tab ultrasonic wave welding method of a battery module including at least two battery cells and an electrode tab extending from each of the battery cells and welded to each other by ultrasonic wave welding, the method including: forming the welding portion forming the welding surface in direction parallel with the battery cell and the electrode tab including the extension extending so as to connect the welding portion to the battery cell; fixing the welding portions so that the welding portions of the electrode tab contact each other; and performing ultrasonic wave welding to fuse the welding portions by ultrasonic wave vibrations.

At the fixing, a zig for fixing the battery cell may be used.

The performing of the ultrasonic wave welding may include pressing the welding surfaces of the welding portions so as to adhere the welding surfaces of the welding portions by an adhering member.

At the pressing, the adhering member may be a roller or a spring.

Advantageous Effects

The battery module and the electrode tab ultrasonic wave welding method according to the exemplary embodiments of the present invention forms the electrode tab in the zigzag form in which the electrode tab extending upwardly is bent downwardly and then, again bent upwardly to allow the electrode tab formed in the zigzag form to absorb the vibrations even when the welding portion formed in parallel with the battery cell is fused by the ultrasonic wave vibrations, thereby minimizing the damage to the battery cell.

Further, the battery module and the electrode tab ultrasonic wave welding method according to the exemplary embodiments of the present invention can simplify the manufacturing process without damaging the battery cell while welding the electrode tab by the ultrasonic wave welding having higher mass production than the laser welding.

BRIEF DESCRIPTION OF THE DRAWINGS

FIG. 1 is a diagram showing battery welding according to the related art.

FIG. 2 is a perspective view of a battery module according to an exemplary embodiment of the present invention.

FIG. 3 is a perspective view of a battery according to the exemplary embodiment of present invention.

FIGS. 4(a) and 4(b) are cross-sectional views showing a bent shape of an electrode tab of a battery according to the exemplary embodiment of the present invention.

FIG. 5 is a cross-sectional view of a battery module according to the exemplary embodiment of the present invention.

FIG. 6 is a cross-sectional view of another battery module according to the exemplary embodiment of the present invention.

FIG. 7 is a cross-sectional view of another battery module according to the exemplary embodiment of the present invention.

FIG. 8 is a perspective view of another battery module according to the exemplary embodiment of the present invention.

FIG. 9 is a schematic view showing an electrode tab ultrasonic wave welding method according to the exemplary embodiment of the present invention.

[Detailed Description of Main Elements]

1: Battery Module
100: Battery Cell
200: Electrode tab
210: Extension
220: Welding Portion
211: First Extension          212: Second Extension
S100 to S310: Each Step of Electrode Tab Welding Method

[Detailed Description of Main Elements]

BEST MODE

Hereinafter, a battery module and an electrode tab ultrasonic wave welding method according to exemplary embodiments of the present invention will be described in detail with reference to the accompanying drawings.

FIG. 1 is a diagram showing battery welding according to the related art, FIG. 2 is a perspective view of a battery module according to an exemplary embodiment of the present invention, FIG. 3 is a perspective view of a battery according to the exemplary embodiment of present invention, FIGS. 4(a) and 4(b) cross-sectional views showing a bent shape of an electrode tab of a battery according to the exemplary embodiment of present inventions, FIG. 5 is a cross-sectional view of a batter module according to the exemplary embodiment of the present invention, FIG. 6 is a cross-sectional view of another battery module according to the exemplary embodiment of the present invention, FIG. 7 is a cross-sectional view of another battery module according to the exemplary embodiment of the present invention, FIG. 8 is a perspective view of another battery module according to the exemplary embodiment of the present invention, and FIG. 9 is a schematic view showing an electrode tab ultrasonic wave welding method according to the exemplary embodiment of the present invention.

A battery module 1 according to the exemplary embodiment of the present invention means that a plurality of batteries is connected to one another. The battery module 1 includes at least two battery cells 100 and a plurality of electrode tabs 200 extending from each of the battery cells 100 so as to be welded to each other.

In this configuration, the battery module 1 is configured to include an extension 210 in which an electrode tab 200 extending upwardly is bent downwardly and a welding portion 220 in which the extension 210 is again bent upwardly to form a welding surface in a direction parallel with the battery cell 100.

In drawings, the welding surface is shown by a bold line.

The extension 210 may be configured to include a first extension 211 extending upwardly in parallel with the battery cell 100 and a second extension 212 extending so as to be bent downwardly from an end of the first extension 211.

That is, the first extension 211 is a portion extending in parallel with the battery cell 100 so that the welding portion 220 is spaced apart from the battery cell 100 and the second extension 212 is a portion extending from the first extension 211 and bent downwardly from the end of the first extension 211 so that the welding portion 220 formed at an end of the first extension 211 contacts a separate welding portion 220 adjacently positioned thereto.

The battery module 1 according to the exemplary embodiment of the present invention has a serial form in which a negative electrode tab 200 and a positive electrode tab 200 that are adjacent to each other are welded to each other. In this case, the negative electrode tab 200 and the positive electrode tab 200 may also be bent in a direction facing each other so as to be welded through the welding surface.

In addition, the battery module 1 has a parallel form in which the adjacent electrode tabs 200 having the same polarity are welded to each other. In this case, the electrode tabs 200 may also be bent in a direction facing each other to be welded to each other through the welding surface.

Therefore, the battery module 1 according to the exemplary embodiment of the present invention may be formed in a serial, parallel, and serial-parallel connection, such that the welding portion 220 forming region does not hinder the battery cell 100 forming region, thereby facilitating the manufacturing of the large-capacity battery module 1.

In particular, in the battery module 1 according to the exemplary embodiment of the present invention, the electrode tabs 200 are welded to each other by ultrasonic wave fusion. In the case of the ultrasonic wave welding, the vibrations due to the ultrasonic wave fusion are transferred to the battery cell 100, which leads to the damage to the battery cell 100.

Therefore, as described above, the battery module 1 according to the exemplary embodiment of the present invention generates a damping effect absorbing the vibrations like a spring by bending the extension 210 downwardly so as to form the electrode tab 200 in a zigzag form, thereby preventing the battery cell 100 from being damaged from the vibrations due to the ultrasonic wave fusion.

As shown in FIG. 6, the battery module 1 may be formed by repeatedly bending upwardly and downwardly the extension 210 bent downwardly.

Therefore, the battery module 1 shown in FIG. 6 may more effectively absorb the vibrations due to the ultrasonic wave fusion.

As the exemplary embodiment of the present invention, as shown in FIG. 7, in the battery module 1, the extension 210 is not formed by being bent in a zigzag form and a predetermined region of the extension 210 extending upwardly may also be protruded outwardly of the surface welded to the adjacent electrode tab 200.

In this case, in the battery module 1, the protruded portion absorbs the vibrations due to the ultrasonic wave fusion, thereby preventing the battery cell 100 from being damaged.

Meanwhile, as shown in FIG. 8, the battery module 1 further includes a dummy tap 300 bent in a 'W' or 'N'-letter shape, wherein one side and the other side of the dummy tap 300 may each be welded to the electrode tab 200 welding portion of the adjacent battery module 1.

Therefore, when the electrode tabs 200 of the battery module 1 are connected in series, the plurality of battery modules 1 may be connected with each other in parallel by connecting with the electrode tabs 200 having the same polarity formed in the battery module 1.

In addition, when the electrode tabs 200 of the battery module 1 are connected in parallel, the plurality of battery modules 1 may be connected with each other in series by connecting with the electrode tabs 200 having different polarities formed in the battery module 1.

The battery module 1 can increase the capacity of the battery module by the aforementioned method.

Meanwhile, as shown in FIG. 9, the electrode tab welding method according to the exemplary embodiments of the present invention includes forming the electrode tab (S100), fixing (S200), and performing the ultrasonic wave welding (S300).

The forming of the electrode tab (S100) is a step of forming the welding portion 220 forming the welding surface in direction parallel with the battery cell 100 and the electrode tab 200 including the extension 210 extending so as to connect the welding portion 220 to the battery cell 100.

The fixing (S200) is a step of fixing the welding portions 200 so that the welding portions 220 of the electrode tabs 200 contact each other. In this case, a zig for fixing the battery cell 100 may be used.

The performing of the ultrasonic wave welding (S300) is a step of welding between the welding portions 220 in a direction parallel with the battery cell 100 (portions adhered to each other so as to form the welding surface) by the fusion due to the ultrasonic wave vibrations.

In this case, the performing of the ultrasonic wave welding (S300) includes pressing (S310) the welding surfaces of the welding portions 220 so as to adhere the welding surfaces of the welding portions 220 by an adhering member, thereby more increasing the welding efficiency.

As the adhering member, a roller or a spring capable of applying force to the welding surface may be used.

As set forth above, the battery module and the electrode tab ultrasonic wave welding method according to the exemplary embodiments of the present invention forms the electrode tab in the zigzag form in which the electrode tab extending upwardly is bent downwardly and then, again bent upwardly to allow the electrode tab formed in the zigzag form to absorb the vibrations even when the welding portion formed in parallel with the battery cell is fused by the ultrasonic wave vibrations, thereby minimizing the damage to the battery cell.

Further, the battery module and the electrode tab ultrasonic wave welding method according to the exemplary embodiments of the present invention can simplify the manufacturing process without damaging the battery cell while welding the electrode tab by the ultrasonic wave welding having higher mass production than the laser welding.

The present invention is not limited to the above-mentioned exemplary embodiments but may be variously applied, and may be variously modified by those skilled in the art to which the present invention pertains without departing from the gist of the present invention claimed in the claims.

[Detailed Description of Main Elements]

1: Battery Module
100: Battery Cell
200: Electrode tab
210: Extension
220: Welding Portion
211: First Extension             212: Second Extension
S100 to S310: Each Step of Electrode Tab Welding Method

The invention claimed is:

1. A battery module including at least two battery cells and electrode tabs being extended from the battery cells and welded to each other by ultrasonic wave welding, the battery module comprising:

extensions of the electrode tabs including a first extension being extended upwardly from the battery cell in a direction parallel with the battery cell and a second extension being extended so as to be bent downwardly from an end of the first extension, wherein the extension includes at least two of each of the first extension and the second extension;

a welding portion in which the second extension is again bent upwardly to form a welding surface in a direction parallel with the battery cell; and a dummy tap in which one side is welded to the welding surface of the electrode tab of the battery module and another side is welded to a welding surface of an electrode tab of an adjacent battery module, wherein each electrode tab adjacent to each other and welded to each other is bent in a direction facing each other, and wherein the dummy tap is bent at least once.

2. The battery module of claim 1, wherein the battery module has a serial form in which a negative electrode tab and a positive electrode tab that are adjacent to each other are welded to each other and each of the negative electrode tab and the positive electrode tab is bent in a direction facing each other so as to be welded through the welding surface.

3. The battery module of claim 1, wherein the battery module has a parallel form in which the adjacent electrode tabs having the same polarity are welded to each other and each of the electrode tabs is bent in a direction facing each other to be welded to each other through the welding surface.

4. The battery module of claim 1, wherein the dummy tap is bent in a 'W' or 'N'-letter shape.

5. The battery module of claim 2, wherein the dummy tap is bent in a 'W' or 'N'-letter shape.

6. The battery module of claim 3, wherein the dummy tap is bent in a 'W' or 'N'-letter shape.

\* \* \* \* \*